Patented Aug. 7, 1928.

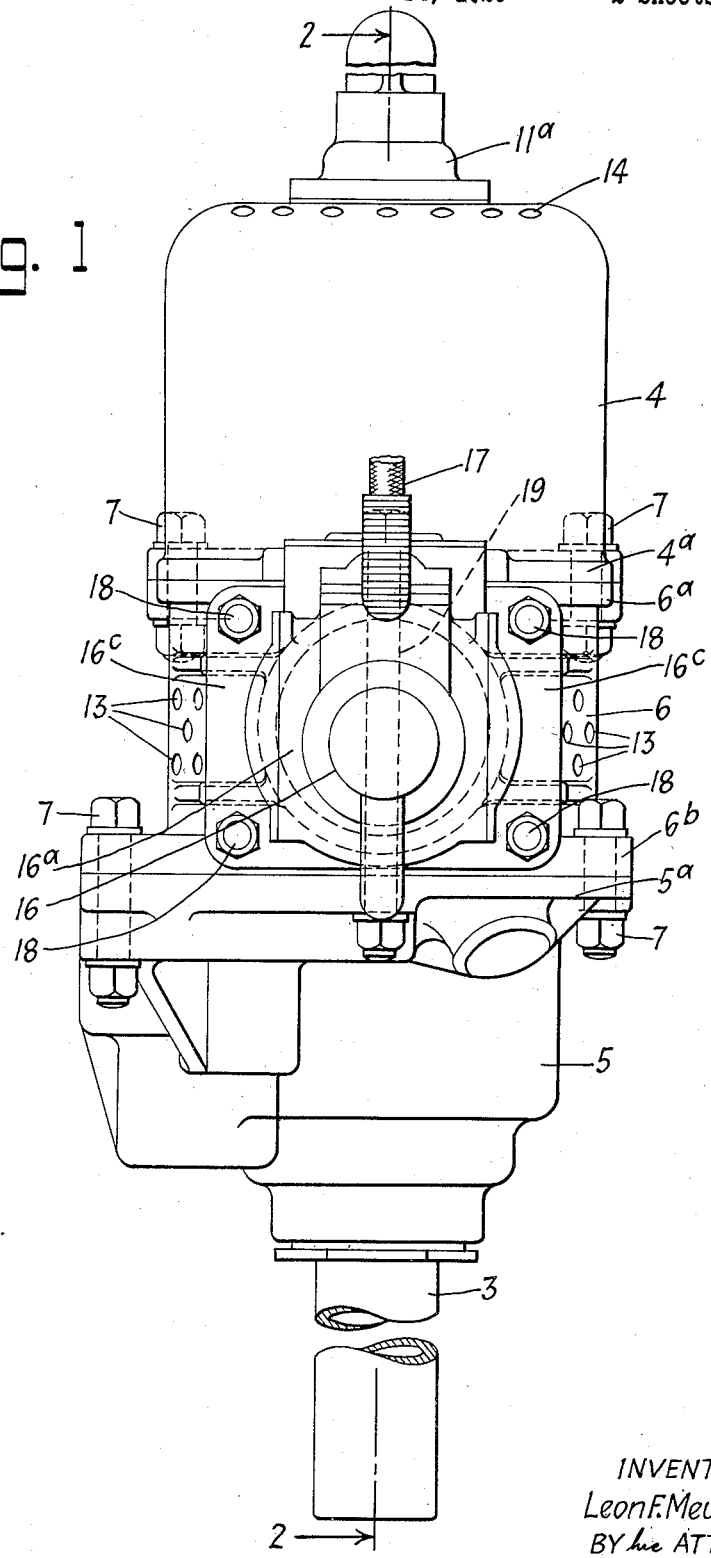

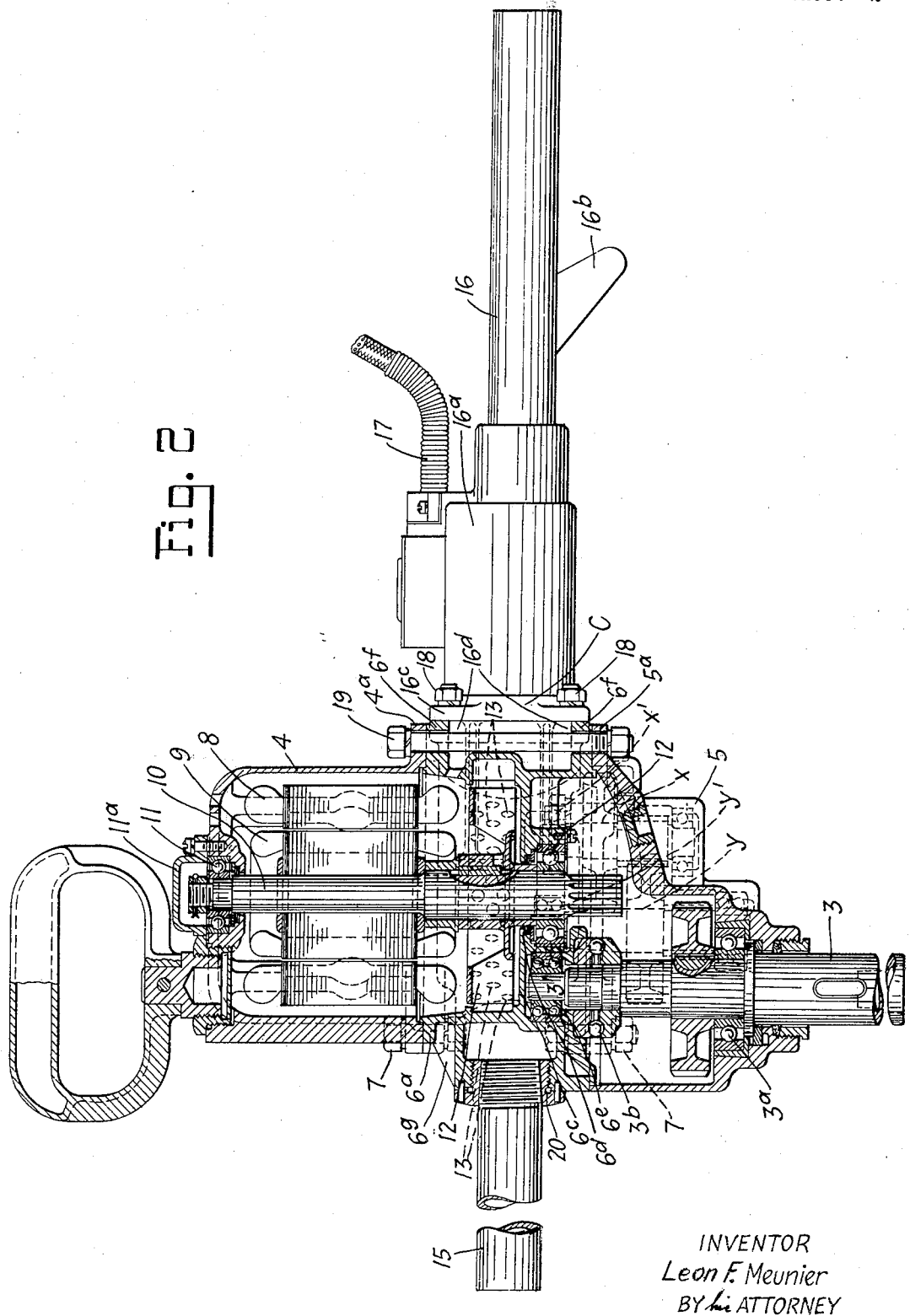

1,679,776

UNITED STATES PATENT OFFICE.

LEON F. MEUNIER, OF CLEVELAND, OHIO, ASSIGNOR TO CHICAGO PNEUMATIC TOOL COMPANY, OF NEW YORK, N. Y., A CORPORATION OF NEW JERSEY.

PORTABLE TOOL.

Application filed March 14, 1925. Serial No. 15,606.

This invention relates to tools of the portable or hand-operated type, particularly adapted for boring, drilling, reaming, tapping and similar operations which require for efficiency and satisfactory service high power and constant torque. More particularly it relates to tools of this type using a small high speed motor and reduction gearing.

One object of the invention is to provide an improved form of housing or casing for a tool of the described type which shall dispose the parts in proper operative relation. Another object is to arrange the manual supporting means in a manner best adapted to secure a proper working balance and to promote ease of manipulation. Other objects including general improvements in the structure of such tools in the interests of more efficient and satisfactory service will be evident from the detailed description which follows.

One form of motor adapted to use in portable tools is the electric motor, particularly the alternating current type operated at frequencies greater than the standard frequency of 60 cycles, as at 120 or 180 cycles. Such a motor is relatively free of complicated and delicately adjusted parts such as commutators and brushes and at high frequencies develops a high speed of rotation which is only very slightly reduced under full load. Such a motor of a given size with proper reduction gearing equals or exceeds in power a direct current motor of considerably greater size with the added advantage of a more constant torque. Attempts to construct a portable tool utilizing a small and relatively light motor of great power resulted in the present invention.

In order to illustrate the invention one concrete embodiment thereof is shown in the accompanying drawings, in which:

Fig. 1 is an end elevational view; and

Fig. 2 is a vertical sectional view on the line 2—2 of Fig. 1.

The embodiment of the invention chosen for the purpose of illustration comprises a portable drill having a rotatable working tool spindle 3 adapted to be driven by a small high speed constant torque motor supported in motor casing 4 and operative through a suitable transmission supported in the gear case 5 in which spindle 3 is rotatably mounted. Casing 4 and housing 5 are provided on their opposed ends with flanges $4^a$ and $5^a$ and interposed between the same in an annular casing member or transfer plate 6 having at its ends flanges $6^a$ and $6^b$ arranged to cooperate with the flanges $4^a$ and $5^a$, bolts 7 being utilized to secure parts 4, 5, and 6 together.

The type of motor illustrated in the drawing is that of a high frequency alternating current electric motor comprising a stator 8 and a rotor 9, the latter being mounted upon the armature shaft 10 (Fig. 2). Since the power of such a motor is much greater than a direct current electric motor of the same size a relatively small motor can be used with a consequent reduction in the weight and size of this portion of the tool, the weight being further decreased by the absence of the direct current commutator and brush assembly. To secure minimum weight and maximum speed the motor is preferably of the two pole type with operating speeds under load from 7,000 R. P. M. up. The motor is adapted and arranged to operate on current having a frequency of 120 cycles or more. The net result is that the high frequency A. C. motor in many instances weighs only about half as much as a D. C. motor of equal or less power. On account of higher armature speed the high frequency A. C. motor will require additional reduction gearing in the transmission mechanism which may mean a slight increase in the weight of the transmission. These factors lower the center of gravity of the tool and require a redesigning and reconstruction of the housing or casing arrangement as compared with the usual direct current tool.

In consequence of the above conditions I prefer to make the annular casing member or transfer plate 6 of substantial width as indicated and to dispose the diaphragm $6^c$ thereof, which is preferably integral therewith, at substantially the center line of plate 6 as will be clear from an inspection of Fig. 2. The armature shaft 10 of the motor extends entirely through the transfer plate 6 and into the transmission housing 5, the diaphragm $6^c$ being provided with an opening $6^d$ for this purpose. Bearings 11 and 12 in the motor casing 4 and on the diaphragm $6^c$ respectively support shaft 10. Portions of the coils of both the stator 8 and the rotor 9 project beyond the motor casing 4 and are housed within the transfer plate 6 when the tool is assembled. Cooling means for the motor are disposed within the limits of the transfer plate 6. Such means may take the form of a fan 12 sleeved upon the armature shaft 10 and disposed adjacent the diaphragm 6ᶜ. For the exit of the current of air induced by the fan a series of ports 13 are provided in the transfer plate 6 intermediate its width, and for its inlet a series of ports 14 are provided in casing 4 adjacent the cap 11ᵃ for bearing 11.

Spindle 3, suitably supported by bearings 3ᵃ and 3ᵇ in housing 5, has a reduced end 3′ which extends beyond housing 5 within transfer plate 6 and terminates adjacent diaphragm 6ᶜ which carries a bearing 6ᵉ therefor. The transmission contained in housing 5 forms no part of the present invention and may be of any suitable or desired type. It is accordingly not described in detail but attention is called to the fact that certain of the shafts such as X and Y indicated by broken lines in Fig. 2, extend, like spindle 3, beyond housing 5 within the transfer plate 6 and are therein supported by suitable bearings indicated at X′ and Y′ mounted on the diaphragm 6ᶜ. Thus portions of both the transmission and the motor extend within and are encased by transfer plate 6.

Transfer plate 6 by reason of its width and its disposition at approximately the center of weight of the tool is utilized to carry the manual supports for the tool. These preferably consists of opposed handles 15 and 16 secured to opposite sides of plate 6 and disposed in the plane of the spindle 3. One of these handles, namely 16, is preferably utilized to support the control means for the motor. To this end it carries switch mechanism disposed in a casing 16ᵃ forming a part thereof to which the power cable 17 extends, the switch mechanism being controlled by an operating lever 16ᵇ. The switch casing 16ᵃ of handle 16 preferably terminates in a substantially rectangular flange 16ᶜ secured by bolts 18 to a cooperating flange 6ᶠ on member 6 (Fig. 2), which provides a space 16ᵈ for the leads (not shown) to the motor. The dead handle 15 may have a threaded connection with a hollow cap member 20 secured in a boss 6ᵍ on plate 6.

With a switch bracket or flange 16ᶜ covering considerable space on the tool as shown and transmitting more or less torque, suitable means should be provided at this point to support the transfer plate 6 relative to the casing 4 and housing 5 without interfering with the convenient detachment of either from said plate. A preferred means for this pupose consists of a single long bolt 19 disposed substantially centrally of the switch handle bracket and passed through aligned openings in flange 4ᵃ, upper and lower flanges 6ᶠ, and flange 5ᵃ.

From the above it will be apparent that the present invention provides a simple, convenient and properly balanced arrangement of parts for a portable tool of the type specified, that the use of a transfer plate of substantial width bolted separately to the transmission housing and to the motor casing permits the removal of either for inspection or repairs without entirely disassembling the tool, that the transfer plate further serves partly to house portions of the transmission and the motor and properly to support such portions extending therewithin, and that the mounting of the manual supporting means upon the transfer plate disposes the same in proper relation to the center of gravity so as to facilitate the handling and efficient use of the tool.

While but one form of the invention has been herein disclosed, it is to be understood that the invention is not restricted to the specific details thereof but covers all modifications and adaptations within the scope of the appended claims.

I claim as my invention:

1. A portable power driven tool having a spindle to be rotated comprising a relatively small high speed motor for normal operation at a speed of at least 7000 R. P. M., a casing for said motor, gearing for transmitting the rotative impulse of the motor to said spindle, a housing for said gearing, an annular casing member of substantial width interposed between said casing and said housing and uniting the same, said member serving partly to inclose and house both said motor and said gearing, and a handle secured to said casing member.

2. A portable power driven tool having a spindle to be rotated comprising a relatively small high speed motor having a normal operating speed of at least 7000 R. P. M., a casing for said motor, means for transmitting the rotative impulse of the motor to said spindle, a housing for said means, an annular member interposed between said housing and said casing and uniting the same, and manual control means for said tool mounted on said member.

3. A portable power driven tool having a spindle to be rotated comprising a relatively small high speed motor having a normal operating speed of at least 7000 R. P. M., a casing for said motor, gearing for transmitting the rotative impulse of the motor to said spindle, a housing for said gearing, an annular member interposed between said housing and said casing and uniting the same, and opposed handles secured to said member, one of said handles having control means for said motor.

4. A portable power driven tool having a rotatable tool spindle, an A. C. high frequency motor normally operating at a speed of at least 7000 R. P. M. for rotating said spindle, a transmission including reduction gearing between the motor and the spindle, a casing for said motor and a housing for said transmission, a casing member interposed between said casing and said housing and uniting the two, said member being of substantial width and serving to inclose a portion of said motor.

5. A portable power driven tool having a rotatable tool spindle, an A. C. high frequency motor normally operating at a speed of at least 7000 R. P. M. for rotating said spindle, a transmission including reduction gearing between the motor and the spindle, a casing for said motor and a housing for said transmission, a casing member interposed between said casing and said housing and uniting the two, said member being of substantial width and serving to inclose a portion of said transmission.

6. A portable power driven tool having a rotatable tool spindle, an A. C. high frequency motor operating under load at a speed greater than 7000 R. P. M. for rotating said spindle, a transmission including reduction gearing between the motor and the spindle, a casing for said motor and a housing for said transmission, a casing member interposed between said casing and said housing and uniting the two, and cooling means for said motor within said member.

7. A portable power driven tool having a rotatable spindle, an A. C. high frequency motor operating under load at a speed greater than 7000 R. P. M. for rotating said spindle, a transmission including reduction gearing between the motor and the spindle, a casing for said motor and a housing for said transmission, a transfer plate of substantial width between said casing and housing uniting the two, bearings for parts of said motor and said transmission in said transfer plate, said plate having an annular series of ports, and a fan on the armature shaft of said motor disposed within said plate in the plane of said openings.

8. A portable power driven tool having a rotatable spindle, an A. C. high frequency motor operating under load at a speed greater than 7000 R. P. M. for rotating said spindle, a transmission including reduction gearing between the motor and the spindle, a casing for said motor and a housing for said transmission, a transfer plate of substantial width between said casing and housing uniting the two, said plate having a transverse diaphragm, said motor and said transmission being arranged to extend partly within said plate, and bearings supported by said diaphragm for the extended portions of said motor and transmission.

9. A portable power driven tool having a rotatable tool spindle, an A. C. high frequency motor operating under load at a speed greater than 7000 R. P. M. for rotating said spindle, a transmission including reduction gearing between the motor and the spindle, a casing for said motor and a housing for said transmission, a casing member interposed between said casing and said housing and uniting the two, said member being of substantial width and serving to inclose a portion of said motor, and manual control means for said tool mounted on said member.

10. A portable power driven tool having a rotatable tool spindle, an A. C. high frequency motor operating under load at a speed greater than 7000 R. P. M. for rotating said spindle, a transmission including reduction gearing between the motor and the spindle, a casing for said motor and a housing for said transmission, a casing member interposed between said casing and said housing and uniting the two, said member being of substantial width and serving to inclose a portion of said transmission, and handles secured to opposite sides of said member and disposed in the plane of said spindle.

11. A portable power driven tool having a rotatable tool spindle, an A. C. high frequency motor operating under load at a speed greater than 7000 R. P. M. for rotating said spindle, a transmission including reduction gearing between the motor and the spindle, a casing for said motor and a housing for said transmission, a casing member interposed between said casing and said housing and separately connected to both, said motor and said transmission being arranged partly to extend within said member and to be inclosed thereby, and manual support and control means for said tool secured to said member.

12. A portable power driven tool having a rotatable spindle, an A. C. high frequency motor operating under load at a speed greater than 7000 R. P. M. for rotating said spindle, a transmission including reduction gearing between the motor and the spindle, a casing for said motor and a housing for said transmission, a transfer plate of substantial width between said casing and housing uniting the two, bearings for parts of said motor and said transmission in said transfer plate, said plate having an annular series of ports, a fan on the armature shaft of said motor disposed within said plate in the plane of said openings, and opposed handles secured to said member, one of said handles having control means for said motor.

13. A portable power driven tool having a rotatable spindle, an A. C. high frequency motor operating under load at a speed greater than 7000 R. P. M. for rotating said spindle, a transmission including reduction gearing between the motor and the spindle, a casing for said motor and a housing for said transmission, a transfer plate of substantial width between said casing and housing uniting the two, said plate having a transverse diphragm, said motor and said transmission being arranged to extend partly within said plate, bearings supported by said diaphragm for the extended portions of said motor and transmission, and opposed handles secured to said member, one of said handles having control means for said motor.

14. A power tool of the portable or hand type comprising a two pole A. C. induction motor adapted to operate on current at a frequency of 120 cycles or more, a spindle, a transmission to enable said spindle to be rotated by said motor, and manual supporting means disposed at a point substantially intermediate said motor and said transmission.

15. An electrically operated tool of the portable or hand type having a rotatable spindle and a small two pole A. C. induction motor for operating said spindle, said motor being adapted to operate on a current having a frequency of at least 120 cycles.

LEON F. MEUNIER.